United States Patent [19]

Bjoerk et al.

[11] Patent Number: 4,985,909
[45] Date of Patent: Jan. 15, 1991

[54] EXPOSURE UNIT FOR A FILM CHANGER

[75] Inventors: Erik Bjoerk, Stockholm; Ola Wiklund, Jaerfaella, both of Sweden

[73] Assignee: Siemens Aktiengesellschaft, Berlin and Munich, Fed. Rep. of Germany

[21] Appl. No.: 275,365

[22] Filed: Nov. 23, 1988

[30] Foreign Application Priority Data

Nov. 26, 1987 [DE] Fed. Rep. of Germany ....... 3740169

[51] Int. Cl.⁵ .............................................. G03B 42/04
[52] U.S. Cl. .................................... 378/173; 378/172; 378/182; 378/187
[58] Field of Search ............... 378/173, 187, 172, 182; 354/275, 278, 281

[56]  References Cited

U.S. PATENT DOCUMENTS

| 2,056,279 | 10/1936 | Kulick . | |
| 3,652,853 | 3/1972 | Williner et al. . | |
| 4,303,327 | 12/1981 | LaBelle et al. . | |
| 4,383,330 | 5/1983 | DeFice et al. | 378/187 |
| 4,613,984 | 9/1986 | Fisher et al. | 378/187 |
| 4,763,346 | 8/1988 | Niedespiel et al. | 378/187 |
| 4,813,063 | 3/1989 | Carmichael et al. | 378/187 |

FOREIGN PATENT DOCUMENTS 1179862  5/1959  France .
1269184  7/1961  France .

Primary Examiner—Carolyn E. Fields
Assistant Examiner—David P. Porta
Attorney, Agent, or Firm—Hill, Van Santen, Steadman & Simpson

[57]  ABSTRACT

An exposure unit for a film changer includes a fastening arrangement for upper and lower platens which are movable relative to one another so that film is introduceable therebetween when in one position and so that the film is pressed between the platens when the platens are in another position. The fastening arrangements of at least the upper platen are resiliently formed to insure parallelism between the lower platen and the upper platen during exposure of the film when the platens press against the film.

10 Claims, 2 Drawing Sheets

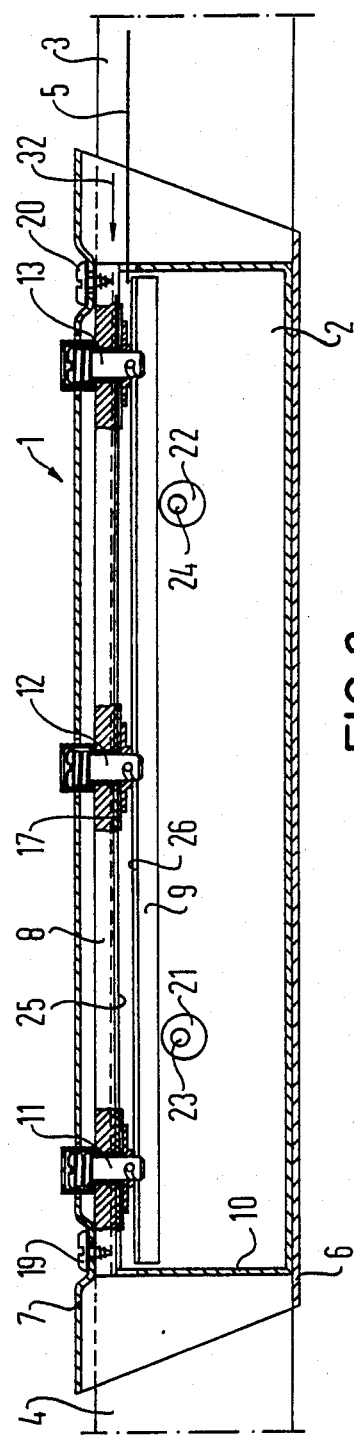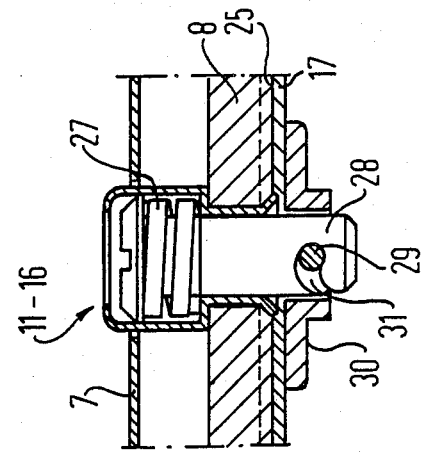

FIG. 3 is a perspective view of an exposure unit as shown in FIG. 1.

EXPOSURE UNIT FOR A FILM CHANGER

BACKGROUND OF THE INVENTION

1. Field of the Invention

The present invention is directed generally to an exposure unit in a film changer, wherein the exposure unit has upper and lower platens which are movable in height relative to one another so that film may be introduced therebetween in one position of the platens and so that the platens press against the film in another position.

2. Description of the Related Art

The quality of a film exposure, and in particular of an x-ray exposure, is dependent on, among other things, how tightly the entire surface of the film presses against the upper platen and the lower platen, or against the reinforcing foil allocated to the platens, during exposure. The quality of the exposure, for example, deteriorates when the platens or the reinforcing foils are not pressed parallel against the film, such as x-ray film, or when air is present between the x-ray film and the reinforcing foils.

In some known exposure units, the upper platen is rigidly attached in the upper region of the exposure unit. The lower platen whose movement ensues, for example, via an eccentric cam that is secured to the exposure unit, is movable in height. In order to obtain parallel positioning of the platens of the exposure unit, the surfaces on which the upper platen rests must be first subject to extremely tight tolerance demands during manufacture. Secondly, the lower platen is adapted to the upper platen in that the lower platen is aligned with different thicknesses of shims. Such measures are extremely time consuming and, as a result, are very expensive.

SUMMARY OF THE INVENTION

An object of the present invention is to provide an exposure unit wherein parallel positioning of the upper and lower platens is obtained in a relatively simple way.

This and other objects are inventively achieved by providing fastening arrangements for at least the upper platen which are resiliently fashioned so that the upper platen is positionally aligned parallel to the lower platen when the platens are pressed against the film, such as x-ray film. A uniform adjacency of the platens against the entire surface of the film is thereby reliably and simply achieved. It is now no longer necessary to perform time-consuming and complicated parallel adjustment of the two platens.

An advantageous development of the invention proposes that the fastening arrangements be provided as spring-loaded screws. Spring loading of the platen which is structurally simple is thus achieved.

A technologically simple solution derives by providing spring-loaded pins as the fastening arrangement, the pins being formed with a quick closure. This enables the upper platen to be removed in a simple way so that the reinforcing foils thereon can be cleaned.

BRIEF DESCRIPTION OF THE DRAWINGS

FIG. 1 is a side elevational view of a film changer including an exposure unit according to the principals of the present invention;

FIG. 2 is an enlarged view in cross section of a fastening arrangement from the exposure unit of FIG. 1; and

DESCRIPTION OF THE PREFERRED EMBODIMENTS

Figure 3:
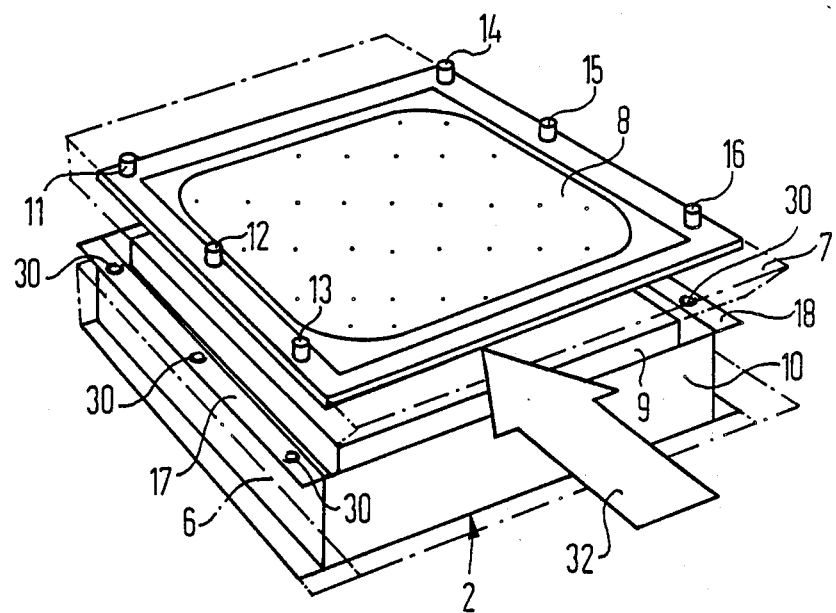

FIG. 1 shows a film changer 1 for producing x-ray film images on x-ray film. The film changer 1 is composed of an exposure unit 2 as well as a supply magazine 3 and a collecting magazine 4 for sheets 5 of x-ray film. The film changer 1 also has a lower housing 6 and an upper housing 7 for the exposure unit 2.

The exposure unit 2 includes an upper platen 8 and a lower platen 9 for supporting the x-ray film 5. The upper platen 8 is attached to flanges 17 and 18 by fastening arrangements 11 through 16 (only fastening arrangements 11, 12 and 13 and flange 17 are being shown in FIG. 1). The flanges 17 and 18 are secured at the two long sides of a housing 10 adjacent the edges thereof.

The upper housing 7 is secured to the upper platen 8 by screws 19 and 20. The lower platen 9 is movable in height by the operation of cam plates 21 and 22 which abut the undersides of the lower platen 9 and which are seated on shafts 23 and 24 for rotation. Reinforcing foils 25 and 26 are secured to the free surfaces of the platens 8 and 9 which lie opposite one another and between which the film 5 is supported.

FIG. 2 shows an enlargement of one of the fastening arrangements 11 through 16 for the upper platen 8 in greater detail. Each fastening arrangement 11 through 16 has a pin or bolt 28 loaded by a spring 27 which is formed as a quick release. The quick closure arrangement is first composed of a disk 30 provided with a pin 29, the disk 30 being secured to the flange 17 or 18. The pin or bolt 28 has a helical groove 31 into which the pin 29 engages when the pin is turned. The pin 28 can also be replaced by a screw, in which case the disk 30 is replaced by a nut.

To produce x-ray film exposures with the film changer 1 disclosed herein one sheet 5 of x-ray film after another is transported in the direction of an arrow 32 by a conveying means, which are known and therefore not shown herein. The film 5 is transported from the supply magazine 3 to the exposure unit 2. The lower platen 9 is then moved up by rotation of the shafts 23 and 24 and the cam plates 21 and 22 and thereby presses against the x-ray film 5. Since the fastening arrangements 11 through 16 of the upper platen are resiliently formed, the upper platen 8 positionally aligns parallel to the lower platen 9 so that a uniform adjacency of the platens 8 and 9 across the entire surface of the x-ray film is achieved.

Referring now to FIG. 3, a plurality of the resiliently formed fastening arrangements 11 through 16 are shown in the upper platen 8 arranged along the edge regions thereof and at the long sides in the conveying direction of the x-ray film 5. The flanges 18 and 20 by which the upper platen 8 is connectable to the housing 10 of the exposure unit 2 can also be seen in FIG. 3. FIG. 3 also shows that the upper platen 8 is removable from the remaining exposure unit 2 together with the upper housing 7 for cleaning by removal of the screws 19 and 20. The arrow 32 shown in FIG. 3 shows the conveying direction of the x-ray film 5.

Thus, there is shown and described an exposure unit for a film changer, such for an x-ray film changer, which has fastening arrangements in at least the upper platen and possibly in the lower platen as well. The two platens are movable in height relative to one another so that the film can be introduced therebetween when in one position and so that the platens press against the x-ray film in another position. The resilient fastening arrangements disclosed herein insure that the upper and lower platens are aligned parallel to one another when pressing against the x-ray film.

Although other modifications and changes may be suggested by those skilled in the art, it is the intention of the inventors to embody within the patent warranted hereon all changes and modifications as reasonably and properly come within the scope of their contribution to the art.

We claim as our invention:

1. An exposure unit in a film changer, comprising:
   an upper platen and a lower platen being movable in height relative to one another so that film is introducible between said upper and lower platens in one position and so that said upper and lower platens press against the film in another position;
   first fastening means for fastening said lower platen; and
   second fastening means for fastening said upper platen, at least said second fastening means being resilient with sufficient flexibility that said upper platen is aligned parallel to said lower platen when said upper and lower platens are pressed against the film.

2. An exposure unit in a film changer, comprising:
   an upper platen and a lower platen being movable in height relative to one another so that film is introducible between said upper and lower platens in one position and so that said upper and lower platens press against the film in another position;
   first fastening means for fastening said lower platen; and
   second fastening means for fastening said upper platen, at least said second fastening means being resilient so that said upper platen is aligned parallel to said lower platen when said upper and lower platens are pressed against the film, said second fastening means being spring-loaded screws.

3. An exposure unit as claimed in claim 2, wherein said spring-loaded screws are quick closure pins.

4. An exposure unit as claimed in claim 1, wherein said second fastening means for said upper platen is arranged at an edge of long sides corresponding to a conveying direction of the film in said exposure unit.

5. An exposure unit in a film changer, comprising:
   an upper platen and a lower platen being movable in height relative to one another so that film is introducible between said upper and lower platens in one position and so that said upper and lower platens press against the film in another position;
   first fastening means for fastening said lower platen; and
   second fastening means for fastening said upper platen, at least said second fastening means being resilient so that said upper platen is aligned parallel to said lower platen when said upper and lower platens are pressed against the film, said second fastening means including:
   a plurality of bolts arranged generally perpendicular to said upper and lower platens;
   a spring extending between each of said pins and said upper platen to resiliently mount said upper platen on said bolts; and
   means for attaching said plurality of bolts in the film changer.

6. An exposure unit as claimed in claim 5, further comprising:
   a spring housing enclosing each of the springs and enclosing at least a portion of each of said bolts said spring housing being affixed to said upper platen.

7. An exposure unit as claimed in claim 5, wherein said means for attaching said pins includes:
   flanges connected to said film changer, said flanges having openings through which said bolts extend;
   pins fixed to said flanges and extending to each of said pins;
   said bolts each having grooves for selectively accepting said pins.

8. An exposure unit as claimed in claim 7, wherein said grooves in said bolts are helically shaped, and
   said bolts are rotatable so that said pins move into and out of said helically shaped grooves as said bolts are rotated.

9. A film changer for holding film or the like, comprising:
   a housing;
   a first platen mounted in said housing for movement between a film engaging position and a film releasing position;
   a second platen in said housing opposite said first platen; and
   means for resiliently mounting said second platen, said means being sufficiently flexible that said second platen is pressed into a position parallel to said second platen when said second platen is in said film engaging position.

10. A film changer for holding film or the like, comprising:
    a housing;
    a first platen mounted in said housing for movement between a film engaging position and a film releasing position;
    a second platen in said housing opposite said first platen; and
    means for resiliently mounting said second platen so that said second platen is able to move to a position parallel to said second platen when said second platen is in said film engaging position, said means for resiliently mounting including:
    first and second flanges mounted along opposing sides of said housing, said first and second flanges defining bolt receiving openings; and
    spring loaded bolts extending through said bolt receiving openings and including a resilient spring connected between a corresponding one of said first and second flanges and said second platens.

* * * * *